United States Patent
Shen et al.

(10) Patent No.: US 10,375,517 B2
(45) Date of Patent: Aug. 6, 2019

(54) CROWD SOURCED PATHWAY MAPS

(71) Applicant: MICROSOFT TECHNOLOGY LICENSING, LLC, Redmond, WA (US)

(72) Inventors: Guobin (Jacky) Shen, Beijing (CN); Yongguang Zhang, Beijing (CN); Thomas Moscibroda, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 850 days.

(21) Appl. No.: 13/791,508

(22) Filed: Mar. 8, 2013

(65) Prior Publication Data

US 2014/0256356 A1    Sep. 11, 2014

(51) Int. Cl.
| | |
|---|---|
| *H04W 4/04* | (2009.01) |
| *H04W 4/02* | (2018.01) |
| *G01C 21/16* | (2006.01) |
| *G01C 21/20* | (2006.01) |
| *G01S 5/14* | (2006.01) |
| *G01S 11/06* | (2006.01) |
| *H04W 64/00* | (2009.01) |
| *G01S 5/02* | (2010.01) |

(52) U.S. Cl.
CPC .......... *H04W 4/023* (2013.01); *G01C 21/165* (2013.01); *G01C 21/206* (2013.01); *G01S 5/0263* (2013.01); *G01S 5/14* (2013.01); *G01S 11/06* (2013.01); *H04W 64/00* (2013.01)

(58) Field of Classification Search
CPC ........ G01C 21/00; G01C 17/02; G01C 21/08; G01C 21/206; G01C 21/32; G01S 5/0257; G01S 19/48; G01S 5/0252; G01S 5/0278; H04W 4/02; H04W 64/00; H04W 24/08; H04W 24/10; H04W 4/04; G06F 17/16
USPC ........................................... 455/456.3, 456.1
See application file for complete search history.

(56) References Cited

U.S. PATENT DOCUMENTS

| | | | |
|---|---|---|---|
| 8,040,219 | B2 | 10/2011 | Haartsen et al. |
| 2007/0207807 | A1 | 9/2007 | Duda |
| 2011/0090081 | A1 | 4/2011 | Khorashadi et al. |
| 2011/0250904 | A1 | 10/2011 | Valletta et al. |
| 2012/0143495 | A1 | 6/2012 | Dantu |

(Continued)

FOREIGN PATENT DOCUMENTS

| | | |
|---|---|---|
| CN | 101718559 A | 6/2010 |
| CN | 102164344 A | 8/2011 |

(Continued)

OTHER PUBLICATIONS

CrowdInside: Automatic Construction of Indoor Floorplans Sep. 2012 US Alzantot Moustafa.*

(Continued)

*Primary Examiner* — Gary Lafontant
(74) *Attorney, Agent, or Firm* — Schwegman Lundberg & Woessner, P.A.

(57) ABSTRACT

Some implementations include identifying a location for a device perceived landmark. The location is identified by monitoring received signal strength of a signal of a wireless access point, detecting the location at which the trend in the received signal strength changes direction, and qualifying the location based on measurements taken form one or more inertial measurement unit sensors.

20 Claims, 7 Drawing Sheets

(56) References Cited

U.S. PATENT DOCUMENTS

2014/0074399 A1* 3/2014 Kelly .......................... 701/522
2014/0080514 A1* 3/2014 Das et al. ................. 455/456.1

FOREIGN PATENT DOCUMENTS

CN 102419180 A 4/2012
EP 1830200 A1 9/2007

OTHER PUBLICATIONS

Thrun et al., "Probabilistic Robotics", The MIT Press, Cambridge, Massachusetts, 2005.
Ahmadi, et al., "Privacy-aware Regression Modeling of Participatory Sensing Data", retrieved on Nov. 16, 2012 at <<http://research.microsoft.com/pubs/135507/sensys10.pdf>>, Proceedings of Conference on Embedded Networked Sensor Systems (SenSys), Nov. 3, 2010, 14 pages.
Alzantot, et al., "CrowdInside: Automatic Construction of Indoor Floorplans", retrieved on Nov. 16, 2012 at <<http://wrc-ejust.org/wp-content/uploads/2012/09/CrowdInside-SIGSPATIAL-2012.pdf>>, Sep. 5, 2012, 10 pages.
Amarasinghe et al., "Robust Landmark Detection and Localization; A Multisensor Approach," Proceedings of the 17th World Congress, the International Federation of Automatic Control, Seoul, Korea, Jul. 6-11, 2008, retrieved from <<http://www.nt.ntnu.no/users/skoge/prost/proceedings/ifac2008/data/papers/3777.pdf>>, 6 pages.
Bahl, et al., "RADAR: An in-Building RF-based User Location and Tracking System", retrieved on Nov. 16, 2012 at <<http://research.microsoft.com/en-us/um/people/padmanab/papers/infocom2000.pdf>>, IEEE, Proceedings of INFOCOM Conference, vol. 2, Mar. 26, 2000, pp. 775-784.
Bruno, et al., "WiSLAM: improving FootSLAM with WiFi", retrieved on Nov. 16, 2012 at <<http://ieeexplore.ieee.org/stamp/stamp.jsp?tp=&arnumber=6071916>>, IEEE, Conference on Indoor Positioning and Indoor Navigation (IPIN), 2011, 10 pages.
Chintalapudi, et al., "Indoor Localization Without the Pain", retrieved on Nov. 16, 2012 at <<http://research.microsoft.com/pubs/135721/ez-mobicom.pdf>>, Proceedings of Conference on Mobile Computing and Networking (MobiCom), Sep. 20, 2010, 12 pages.
Cho, et al., "AutoGait: A Mobile Platform that Accurately Estimates the Distance Walked", retrieved on Nov. 16, 2012 at <<http://ieeexplore.ieee.org/stamp/stamp.jsp?tp=&arnumber=5466984>>, IEEE, Conference on Pervasive Computing and Communications (PerCom), Mar. 29, 2010, pp. 116-124.
Constandache, et al., "Did You See Bob?: Human Localization Using Mobile Phones", retrieved on Nov. 16, 2012 at <<http://www.cs.duke.edu/~ionut/escort_mobicom10.pdf>>, Proceedings of Conference on Mobile Computing and Networking (Mobicom), Sep. 20, 2010, 12 pages.
Constandache, et al., "Towards Mobile Phone Localization without War-Driving", retrieved on Nov. 16, 2012 at <<http://ieeexplore.ieee.org/stamp/stamp.jsp?tp=&arnumber=5462058>>, IEEE, Proceedings of INFOCOM Conference, Mar. 14, 2010, pp. 2321-2329.
Dabek, et al., "Vivaldi: A Decentralized Network Coordinate System", retrieved on Nov. 16, 2012 at <<http://www.cs.cornell.edu/People/egs/cs615-spring06/vivaldi.pdf>>, ACM SIGCOMM, Proceedings of Conference on Applications, Technologies, Architectures, and Protocols for Computer Communications, Aug. 30, 2004, pp. 15-26.
Evennou, et al., "Advanced Integration of WiFi and Inertial Navigation Systems for Indoor Mobile Positioning", retrieved on Nov. 16, 2012 at <<http://asp.eurasipjournals.com/content/pdf/1687-6180-2006-086706.pdf>>, Hindawi Publishing Corporation, EURASIP Journal on Applied Signal Processing, vol. 2006, Article ID 86706, Jan. 2006, 11 pages.
"FeetLoc: Crowdsourcing-friendly Indoor Mapping and Localization System using Mobile Phones", retrieved on Nov. 16, 2011 at <<http://research.microsoft.com/en-us/projects/1stloc/defaultaspx>>, Nov. 16, 2012, 2 pages.
Ferris, et al., "WiFi-SLAM Using Gaussian Process Latent Variable Models", retrieved on Nov. 16, 2012 at <<http://www.cs.washington.edu/robotics/postscripts/gplvm-wifi-slam-ijcai-07.pdf>>, Proceeding of Conference on Artificial Intelligence (IJCAI), Jan. 6, 2007, 6 pages.
Gwon, et al., "Error Characteristics and Calibration-free Techniques for Wireless LAN-based Location Estimation", retrieved on Nov. 16, 2012 at <<http://citeseerx.ist.psu.edu/viewdoc/download;jsessionid=6AE3D178997ACB139F86A694BE88C292?doi=10.1.1.149.1963&rep=rep1&type=pdf>>, Proceedings of Workshop on Mobility Management and Wireless Access Protocols (MobiWac), Oct. 1, 2004, pp. 2-9.
Haeberlen, et al., "Practical Robust Localization over Large-Scale 802.11 Wireless Networks", retrieved on Nov. 16, 2012 at <<http://www.cis.upenn.edu/~ahae/papers/mobicom2004.pdf>>, Proceedings of Conference on Mobile Computing and Networking (MobiCom), Sep. 26, 2004, 15 pages.
Howard, et al., "Relaxation on a Mesh: A Formalism for Generalized Localization", retrieved on Nov. 16, 2012 at <<http://cres.usc.edu/pubdb_html/files_upload/94.pdf>>, IEEE/RSJ, Proceedings of Conference on Intelligent Robots and Systems, Oct. 29, 2001, vol. 2, pp. 1055-1060.
Ji, et al., "ARIADNE: A Dynamic Indoor Signal Map Construction and Localization System", retrieved on Nov. 16, 2012 at <<http://static.usenix.org/events/mobisys06/full_papers/p151-ji.pdf>>, Proceedings of Conference on Mobile Systems, Applications, and Services (MobiSys), Jun. 19, 2006, pp. 151-164.
Jimenez, et al., "A Comparison of Pedestrian Dead-Reckoning Algorithms using a Low-Cost MEMS IMU", retrieved on Nov. 16, 2012 at <<http://ieeexplore.ieee.org/stamp/stamp.jsp?tp=&arnumber=5286542>>, IEEE, Proceedings of Symposium on Intelligent Signal Processing (WISP), Aug. 26, 2009, pp. 37-42.
Kim, et al., "A Step, Stride and Heading Determination for the Pedestrian Navigation System", retrieved on Nov. 16, 2012 at <<http://www.gnss.com.au/JoGPS/v3n12/v3n12p34.pdf>>, Journal of Global Positioning Systems, vol. 3, No. 1-2, 2004, pp. 273-279.
Li, et al., "A Reliable and Accurate Indoor Localization Method Using Phone Inertial Sensors", retrieved on Nov. 16, 2012 at <<http://research.microsoft.com/en-us/um/people/zhao/pubs/ubicomp12_IndoorNav.pdf>>, Proceedings of Conference on Mobile Computing and Networking (UbiComp), Sep. 5, 2012, 10 pages.
Lim, et al., "Zero-Configuration, Robust Indoor Localization: Theory and Experimentation", retrieved on Nov. 16, 2012 at <<http://ieeexplore.ieee.org/stamp/stamp.jsp?tp=&arnumber=4146876>>, IEEE, Proceedings of INFOCOM Conference, Apr. 2006, 12 pages.
"Log-distance path loss model", retrieved Nov. 19, 2012 at <<http://en.wikipedia.org/wiki/Log-distance_path_loss_model>>, 2012, 3 pages.
Moore, et al. "Robust Distributed Network Localization with Noisy Range Measurements", retrieved on Nov. 16, 2012 at <<http://rvsn.csail.mit.edu/netloc/sensys04.pdf>>, Proceedings of Conference on Embedded Networked Sensor Systems (SenSys), Nov. 3, 2004, 12 pages.
Park, et al., "Growing an Organic Indoor Location System", retrieved on Nov. 16, 2012 at <<http://mis.haifa.ac.il/~mis/userfiles/file/mobi128-park.pdf>>, Proceedings of Conference on Mobile Systems, Applications and Services (MobiSys), Jun. 15, 2010, 14 pages.
Priyantha, et al., "Anchor-Free Distributed Localization in Sensor Networks", retrieved on Nov. 16, 2012 at <<http://ahvaz.ist.unomaha.edu/azad/temp/ali/03-priyantha-localization-wireless-sensor-networks-cricket. pdf>>, MIT Laboratory for Computer Science, Tech Report 892, Apr. 2003, 13 pages.
Rai, et al., "Zee: Zero-Effort Crowdsourcing for Indoor Localization", retrieved on Nov. 16, 2012 at <<http://research.microsoft.com/pubs/166309/com273-chintalapudi.pdf>>, Proceedings of Conference on Mobile Computing and Networking (Mobicom), Aug. 22, 2012, 12 pages.
Robertson, et al., "Collaborative Pedestrian Mapping of Buildings Using Inertial Sensors and FootSLAM", retrieved on Nov. 16, 2012 at <<http://www.kn-s.dlr.de/indoornav/ION_2011_feetSLAM.

(56) References Cited

OTHER PUBLICATIONS pdf>>, Proceedings of Technical Meeting of the Satellite Division of the Institute of Navigation (ION GNSS), Sep. 2011, pp. 1366-1377.

Robertson, et al., "Improving Simultaneous Localization and Mapping for Pedestrian Navigation and Automatic Mapping of Buildings by using Online Human-Based Feature Labeling", retrieved on Nov. 16, 2012 at <<http://ieeexplore.ieee.org/stamp/stamp.jsp?tp=&arnumber=5507304>>, IEEE/ION, Position Location and Navigation Symposium (PLANS), May 4, 2010, pp. 365-374.

Robertson, et al., "Simultaneous Localization and Mapping for Pedestrians using only Foot-Mounted Inertial Sensors", retrieved on Nov. 16, 2012 at <<http://citeseerx.ist.psu.edu/viewdoc/download?doi=10.1.1.180.5158&rep=rep1&type=pdf>>, Proceedings of Conference on Ubiquitous Computing (UbiComp), Sep. 30, 2009, 4 pages.

Savvides, et al., "Dynamic Fine-Grained Localization in Ad-Hoc Networks of Sensors", retrieved on Nov. 16, 2012 at <<http://ahvaz.ist.unomaha.edu/azad/temp/ali/01-savvides-localization-wireless-sensor-networks-fine-grained.pdf>>, Proceedings of Conference on Mobile Computing and Networking (MobiCom), Jun. 16, 2001, 14 pages.

Scarlett, "Enhancing the Performance of Pedometers Using a Single Accelerometer", retrieved on Nov. 16, 2012 at <<http://energy.analog.com/static/imported-files/application_notes/47076299220991AN_900.pdf>>, Analog Devices, Application Note AN-900, May 2007, 16 pages.

Shang, et al., "Localization from Mere Connectivity", retrieved on Nov. 16, 2012 at <<http://citeseerx.ist.psu.edu/viewdoc/download?doi=10.1.1.2.8478&rep=rep1&type=pdf>>, Proceedings of Symposium on Mobile Ad Hoc Networking and Computing (MobiHoc), Jun. 1, 2003, pp. 201-212.

Steinhoff, et al., "Dead Reckoning from the Pocket—An Experimental Study", retrieved on Nov. 16, 2012 at <<http://ieeexplore.ieee.org/stamp/stamp.jsp?arnumber=05466978>>, IEEE, Proceedings of Conference on Pervasive Computing and Communications (PerCom), Mar. 29, 2010, pp. 162-170.

Thrun, et al., "Probabilistic Robotics", The MIT Press, Chapter 9: Occupancy Grid Mapping, Sep. 2005, pp. 281-335.

Wang, et al., "No Need to War-Drive Unsupervised Indoor Localization", retrieved on Nov. 16, 2012 at <<http://synrg.ee.duke.edu/papers/unloc-final.pdf>>, Proceedings of Conference on Mobile Systems, Applications, and Services (MobiSys), Jun. 25, 2012, 14 pages.

Woodman, et al., "Pedestrian Localisation for Indoor Environments", retrieved on Nov. 16, 2012 at <<http://www.cl.cam.ac.uk/research/dtg/www/publications/public/ojw28/Main-PersonalRedist.pdf>>, Proceedings of Conference on Ubiquitous Computing (UbiComp), Sep. 21, 2008, 10 pages.

Yamanaka, et al., "Localization of Walking or Running User with Wearable 3D Position Sensor", retrieved on Nov. 16, 2012 at <<http://ieeexplore.ieee.org/stamp/stamp.jsp?tp=&arnumber=4414614>>, Proceedings of Conference on Artificial Reality and Telexistence (ICAT), Nov. 11, 2007, pp. 39-45.

Yang, et al., "Locating in Fingerprint Space: Wireless Indoor Localization with Little Human Intervention", retrieved on Nov. 16, 2012 at <<http://www.cse.ust.hk/~liu/LIFS.pdf>>, Proceedings of Conference on Mobile Computing and Networking (Mobicom), Aug. 22, 2012, 12 pages.

PCT/US2014/020053 Written Opinion of the Internation Preliminary Examining Authority. dated Jan. 20, 2015, 5 pages.

"International Preliminary Report on Patentability Issued in PCT Application No. PCT/US2014/020053", dated Jun. 12, 2015, 8 Pages.

PCT International Search Report and the Written Opinion for Application No. PCT/US2014/020053 dated Jun. 16, 2014, 9 pgs.

"Office Action Issued in European Patent Application No. 14713653.5", dated Mar. 22, 2017, 7 Pages.

"First Office Action and Search Report Issued in Chinese Patent Application No. 201480013067.7", dated Mar. 20, 2017, 14 Pages.

"Second Office Action and Search Report Issued in Chinese Patent Application No. 201480013067.7", dated Sep. 4, 2017, 17 Pages.

Sun, et al., "Research on RSSI-based Location in Smart Space", In Journal of Acta Electronica Sinica, vol. 35, Issue 7, Jul. 1, 2007, 6 Pages.

"Third Office Action and Search Report Issued in Chinese Patent Application No. 201480013067.7", dated Dec. 21, 2017, 12 Pages.

"Office Action Issued in European Patent Application No. 14713653.5", dated Jun. 15, 2018, 9 Pages.

* cited by examiner

CROWD SOURCED PATHWAY MAPS

BACKGROUND

Indoor location-based services typically rely on prior knowledge of buildings, such as the floor plans or blueprints to accurately provide their services. However, obtaining the prior knowledge often requires the service provider to acquire floor plans of, or perform onsite surveys for, each location before making their services or applications available to the general public. Unfortunately, floor plans are often hard to obtain, typically proprietary information and/or may belong to various parties with different and sometimes competing interests, such as the building owner, the building developers, the building architect, among others.

Additionally, in many cases, such as legacy buildings or shopping centers, the floor plans may be outdated due to extensive remodeling, or may no longer exist at all. Often times the cost of obtaining the floor plan and/or onsite survey outweighs the benefit to the service provider of providing the indoor location-based services for a particular location. This can create a situation in which the service provider requires the building owner to opt-in to the program by providing the necessary information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations herein include a system for generating pathway maps. In one instance if a mobile device is in range of a wireless access point, the mobile device monitors a trend in the received signal strength of the wireless signal from the wireless access point as the mobile device is moved. The mobile device is able to identify the location at which the trend of the received signal strength switches from increasing to decreasing or decreasing to increasing and mark the location as a device perceived landmark. In one example, the data related to multiple device perceived landmarks is provided to a server system by a plurality of mobile devices. The server system is then configured to generate one or more pathway maps from the data.

BRIEF DESCRIPTION OF THE DRAWINGS

The Detailed Description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
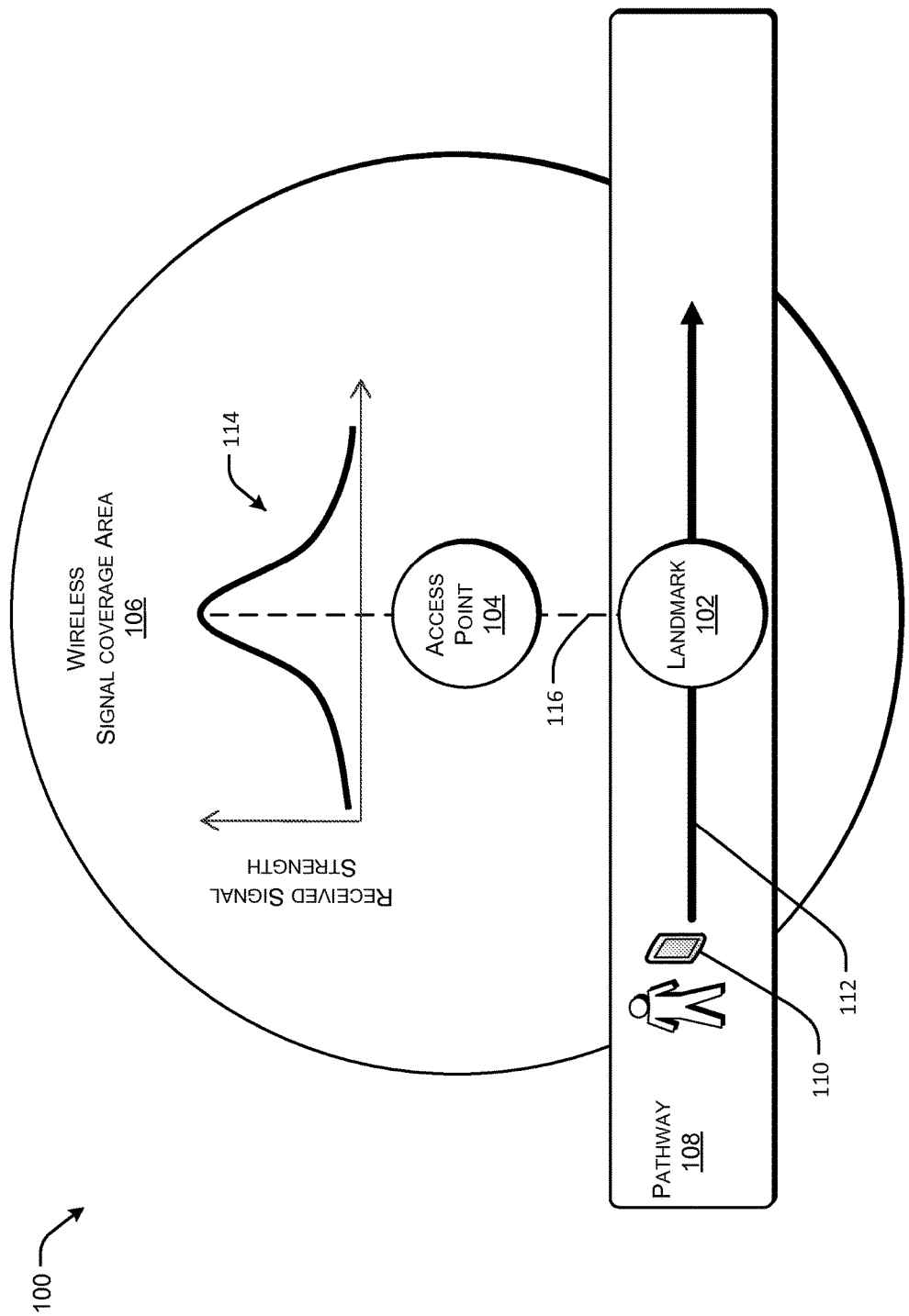
FIG. 1 is a pictorial view of an example environment for locating a device perceivable landmark according to some implementations.

Some implementations herein include a system for generating pathway maps for use by applications, such as indoor location-based services, by leveraging the fact that many people walk in buildings while carrying their mobile devices (such as mobile/smart phones or tablets). For example, inertial measurement unit (IMU) sensors (electronic sensors that measure and monitor velocity, orientation, and gravitational forces, such as accelerometers, magnetometers, gyroscopes and GPS) may be utilized to determine that a mobile device is in motion, a direction of movement of the mobile device, and a distance traveled. A server system may then collect direction and distance data from multiple mobile devices and, together with common reference points, fuse the data into accurate pathway maps.

In one implementation, the mobile devices are configured to identify device perceived landmarks based on trends in the received signal strengths (RSS) of wireless signals and to provide data related to the device perceivable landmarks to the server system for use as the common reference points. The device perceived landmarks are located at positions where the mobile device determines that a trend in RSS switches from increasing to decreasing or from decreasing to increasing. Device-perceived landmarks identified in this manner are uniquely identifiable, stable, located at fixed known locations, provide consistent reference points, and are discoverable without user intervention or attention.

In one example, the mobile device may be configured to monitor an RSS of wireless signal emitted from a wireless access point in range. A trend in the RSS, either increasing or decreasing, can then be determined as the mobile device is moved. For instances, as the mobile device moves closer to the wireless access point the RSS increases until the mobile device passes the wireless access point. When the mobile device begins to move away from the wireless access point the trend of the RSS decreases. The mobile device is able to identify the tipping point or the location at which the trend of the RSS switches from increasing to decreasing and to mark this location as a device perceived landmark.

In another implementation, the server system applies an embedding algorithm based on measured displacement vectors to cluster and assign coordinates to the device perceivable landmarks. For example, because of sensing noise and motion, different mobile devices report slightly different locations for the same device perceivable landmark. To compensate for these differences, the server system classifies the device perceivable landmarks using the basic service set identification (BSSID) of the master wireless access point at the time corresponding to the identification of the device perceivable landmark. The server then iteratively merges the device perceivable landmarks with the same master BSSID unless the distance between them exceeds a pre-determined threshold to form landmark sets. The landmark set can then be used as a set of common reference points.

In another implementation, a server system receives IMU sensor data corresponding to distance and direction of travel together with BSSID of the master wireless access point. The server system is able to compile the IMU sensor data into a plurality of segments beginning and ending at device perceived landmarks. The server overlay each of the segments one on top of the other using the landmark set as common references to generate a pathway map.

Illustrative Environments

Examples of situations in which device perceivable landmarks may be detected and used for generating pathway maps are further illustrated in FIGS. 1 and 2 below. FIG. 1 is a pictorial view of an example environment 100 for locating a device perceivable landmark 102 according to some implementations. Environment 100 includes wireless access point 104, which generates wireless signal coverage area 106 and pathway 108.

Generally, the wireless access point 104 is an electronic device that emits a wireless signal measurable by the mobile device. In some examples, the wireless access point 104 is a device that allows other wireless enabled devices to connect to one or more networks using Wi-Fi, or another wireless standard. For instance, the wireless access point 104 may be a wireless router or cell tower which the mobile devices are able to communicate with when the mobile devices are located within the wireless signal coverage area 106 emitted from the wireless access point 104.

The wireless signal coverage area 106 is typically centered around the wireless access point 104 and extends outwards in all directions. As a wireless enabled mobile device moves away from the wireless access point 104 the wireless signal strength decreases until the mobile device is no longer able to communicate with the wireless access point 104. Generally, the coverage varies depending on the type and strength of the wireless access point 104, obstructions within the coverage area (such as walls) and interference.

A pathway 108 is a designated path that mobile device users repeatedly walk on, such as a hallway, corridor, passageway of a building, a sidewalk, a road or other pathway. Pathway 108 is typically a constrained area in which all walkers move in substantially the same directions and originations. For example, a hallway with mostly back and forth motion.

In the illustrated example, a mobile device 110 is shown as moving along pathway 108 in substantially the direction 112, for example in the pocket of a mobile device user. As the mobile device 110 moves, the mobile device 110 periodically measure the wireless signal emitted from wireless access point 104 to determine a RSS. The mobile device 110 continues to measure for the RSS as the mobile device 110 moves along pathway 108. As is illustrated in graph 114, the mobile device 110 determines that the RSS increases until the mobile device 110 reaches line 116. At line 116 the mobile device 110 is as close to the wireless access point 104 as the mobile device 110 is able to reach along pathway 108 and, as is illustrated in graph 114, the RSS is at the maximum. After the mobile device 110 passes line 116 the RSS decreases until the mobile device 110 exits the wireless signal coverage area 106.

The mobile device 110 (or a server system to which the mobile device 110 provides the RSS data) is configured to detect the maximum RSS and to mark the location of the maximum RSS as a device perceivable landmark. By measuring and monitoring the RSS of the wireless signal for the tipping point, landmarks can be identified without prior knowledge.

In one example, the mobile device 110 is configured to analyze the trend in the RSS, either increasing or decreasing, rather than the RSS values. By monitoring the trend in RSS (the slope of graph 114) for a tipping point (as illustrated at line 116 or the location at which the trend of the RSS switches from increasing to decreasing) rather than the actual values at the time of scanning, error in locating the device perceivable landmark 102 at the same location caused by diversity in mobile device and patterns in use are reduced.

For example, mobile devices typically include a wide variety of wireless receivers, which cause the perceived RSS to vary and may result in slightly different locations for the tipping point. Even with the same mobile device 110, variations in the perceived RSS may still be introduced by the user. For example, some users may carry the mobile device 110 in their hand while others may place the mobile device 110 in their pocket. Different placements of mobile device 110 result in different levels of signal interference and signal attenuation, and result in variations in the RSS readings at the time of scanning. However by identifying the tipping point based on a trend in the RSS rather than value, the location at which a device perceived landmark occurs is more stable and easily identified, as the change in the trend of the RSS tends to be more consistent across device types and usage patterns, than the value of the RSS itself.

FIG. 1 illustrates one example for locating a device perceivable landmark 102 based on trends of RSS of a wireless signal from a single wireless access point in a single pathway. FIG. 2 provides additional examples to illustrate placement of multiple device perceivable landmarks in a building with multiple wireless access points and multiple pathways.

Figure 2:
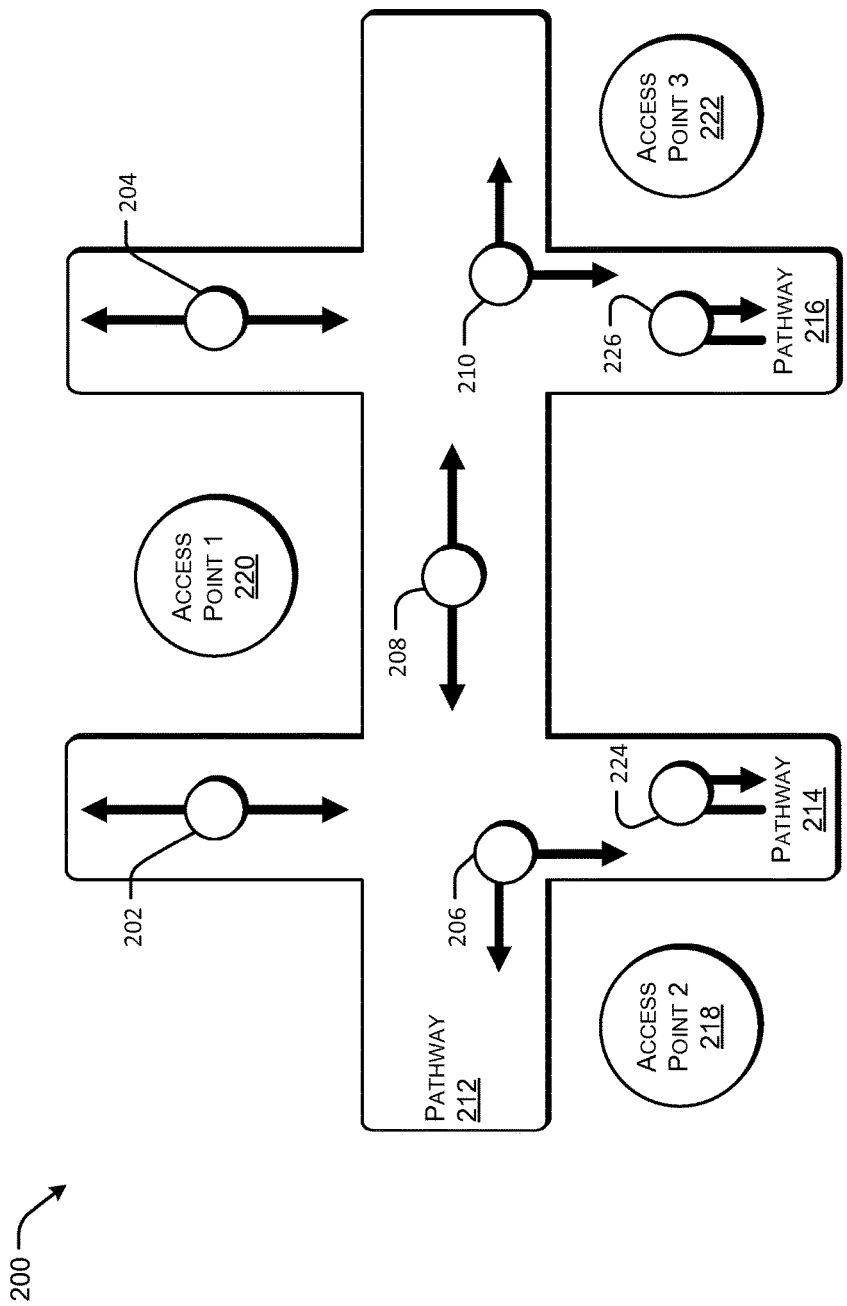
FIG. 2 is a pictorial view of an example environment for locating device perceivable landmarks according to some implementations.

FIG. 2 is a pictorial view of an example environment 200 for locating device perceivable landmarks 202, 204, 206, 208 and 210 according to some implementations. Environment 200 includes pathways 212, 214 and 216 and wireless access points 218, 220 and 222.

In the illustrated example, device perceived landmarks 202, 204 and 208 are associated with wireless access point 220 and are formed in a manner discussed above with respect to device perceived landmark 102 and wireless access point 104. For instance, as a mobile device, such as mobile device 110, is moved up or down pathway 214, the mobile device monitors the trend in the RSS and to identify the tipping point (at the location of device perceived landmark 202).

The illustrated example also includes device perceived landmarks 206 and 210 located at intersections of pathways and at a location where the direction of movement substantially changed (a turn was made). At device perceived landmarks, such as landmarks 206 and 210, the mobile device identifies location at which the trend of the RSS switches from decreasing to increasing.

For example, device perceived landmark 206 is associated with the wireless access point 218 (i.e. wireless access point 218 is the master). If a mobile device is carried by a user up pathway 214 towards pathway 212 the RSS has a decreasing trend with respect to the wireless access point 218 (that is the mobile device is moving away from the wireless access point 218). At the intersection of pathways 214 and 212 the mobile device is illustrated as turning left down pathway 212. After the turn, the trend of the RSS is increasing with respect to the wireless access point 218 (that is the mobile device is moving towards the wireless access point 218). Thus, the mobile device is able to determine the location at which the trend of the RSS switches from decreasing to increasing and to identify this location as device perceived landmark 206. In some instances, the mobile device may utilizes IMU sensor data to identify that the user has turned a corner to aid in verifying that the device perceived landmark 206 is a valid unique landmark.

As illustrated, environment 200 also includes two locations 224 and 226 which may be identified as device perceivable landmarks but are not. Locations 224 and 226, as illustrated, are locations at which the mobile device made a u-turn. These u-turns cause the mobile device to detect a change in the trend of the RSS, either from increasing to decreasing or decreasing to increasing. For example, at location 224 as the mobile device moves up pathway 214 the RSS from wireless access point 218 is increasing but when the mobile device turns around at landmark 224 the RSS immediately beings to decrease causing the identification of a tipping point. However, these u-turn locations are unstable as they may occur at any given location. Therefore, in some implementations, the mobile device performs a qualification process after detecting each tripping point to ensure that the tipping point occurred during a stable walking motion. For example, the qualification process may include analyzing the IMU sensor data to detect changes in direction such as u-turns or zigzags. If the IMU sensor data indicates one of these types of motion then the tripping point is disqualified from being the location of a device perceived landmark.

In the illustrated implementation, the mobile device should be able to identify repeat landmarks and distinguish between unique landmarks, such as landmarks 202-210. For instance, sensing noise and user motion may cause the landmarks to be identified at slightly different locations and so the mobile device may perform the additional operations to verify the identity of detected landmarks. For example, in environment 200 when identifying device perceived landmark 202 the mobile device may distinguish landmark 202 from device perceived landmarks 204, 206, 208 and 210. To do so, the mobile device relies on secondary information.

One type of secondary information the mobile device may rely on to distinguish device perceived landmarks is IMU sensor data, such as direction of movement and location of turns. The mobile device (or a server system) may distinguish device perceived landmarks 208 from landmark 202 using IMU sensor data associated with landmarks. For example, the IMU data at landmark 208 indicates that the mobile device is moving in a direction perpendicular to the direction at the time landmark 202 is identified. The perpendicular movement is used to determine that the landmarks 202 and 208 are distinct. In another example, the IMU sensor data can be used to determine that a turn was made at the location of device perceived landmarks, such as at the device perceived landmarks 206 and 210. By identifying that a turn was made at the location of the device perceived landmarks 206 and 210 but not at the location of device perceived landmark 202, the landmarks 206 and 210 may be distinguished from device perceived landmark 202.

Another type of secondary information that may be used is the signal strength of wireless access points at the time landmarks are identified. Mobile devices are able to recognize wireless signals from each of the wireless access points within the range of the mobile device's receiver. These wireless access points are typically referred to as visible. The mobile device is able to recognize and distinguish between signals from different visible wireless access points based on the BSSID associated with each wireless access point. In the illustrated example, wireless access points 218, 220 and 222 are visible to the mobile device and the BSSID of each may be identified.

Typically, the mobile device associates with the wireless access point whose RSS is the strongest (i.e. the wireless access point providing the best signal). The associated wireless access point is referred to as the master. In this example, the BSSIDs can also be used by the mobile device (or a server system) to distinguish device perceived landmarks 206 and 210 from landmark 202. The BSSID of the master wireless access point at the time device perceived landmarks 206 and 210 are identified are wireless access point 218 and 222 respectively. Thus the mobile device is able to distinguish landmarks 206 and 210 from landmark 202 based on the different master wireless access points, as the master wireless access point at landmark 202 is wireless access point 220. The mobile device is also able to provide the BSSID of the visible wireless access points to the server, in addition to the device perceived landmarks to aid in generating pathway maps, as will be discussed in more detail below.

In another example, the mobile device (or a server system) may distinguish device perceived landmarks by relying the RSS of the neighboring wireless access points. For instance, a device perceived landmark (DPL) may be defined using the following three tuple:

$$DPL \triangleq \{BSSID, (D_1, D_2), N\}$$

where BSSID is the ID of the master wireless access point, (D1, D2) are steady directions before and after the tipping point of the RSS trend and N is the set of BSSIDs corresponding to neighboring wireless access points (wireless access points 218 and 222) visible to the mobile device 110 at the location of a device perceived landmark together with each of the neighboring wireless access points RSS values with respect to the master wireless access point. By defining the device perceived landmark including the set of neighboring BSSIDs together with their RSS values with respect to the master wireless access point, the mobile device is able to more reliably distinguish between unique device perceived landmarks, even when master is the same wireless access point.

For example, the mobile device (or server system) may distinguish the device perceived landmark 204 from the device perceived landmark 202 by comparing the RSS of the wireless access points 218 and 222. At the device perceived landmark 204 the RSS from the wireless access point 218 relative to the RSS of the wireless access point 220 (the master for both landmarks 202 and 204) is much stronger than the RSS from the wireless access point 222 relative to RSS from the wireless access point 220. Likewise, at the device perceived landmark 202 the RSS from the wireless access point 222 relative to the RSS of the wireless access point 220 is much stronger than the RSS from the wireless access point 218 relative to the RSS of the wireless access point 220. By detecting the difference in relative RSS with respect to the RSS of wireless access point 220, or the lack thereof, the mobile device is able to determine that two landmarks are unique. It should be understood, that by using the relative RSS values with respect to the master instead of the RSS values mitigates issues typically associated with device diversity.

Illustrative Systems

Figure 3:
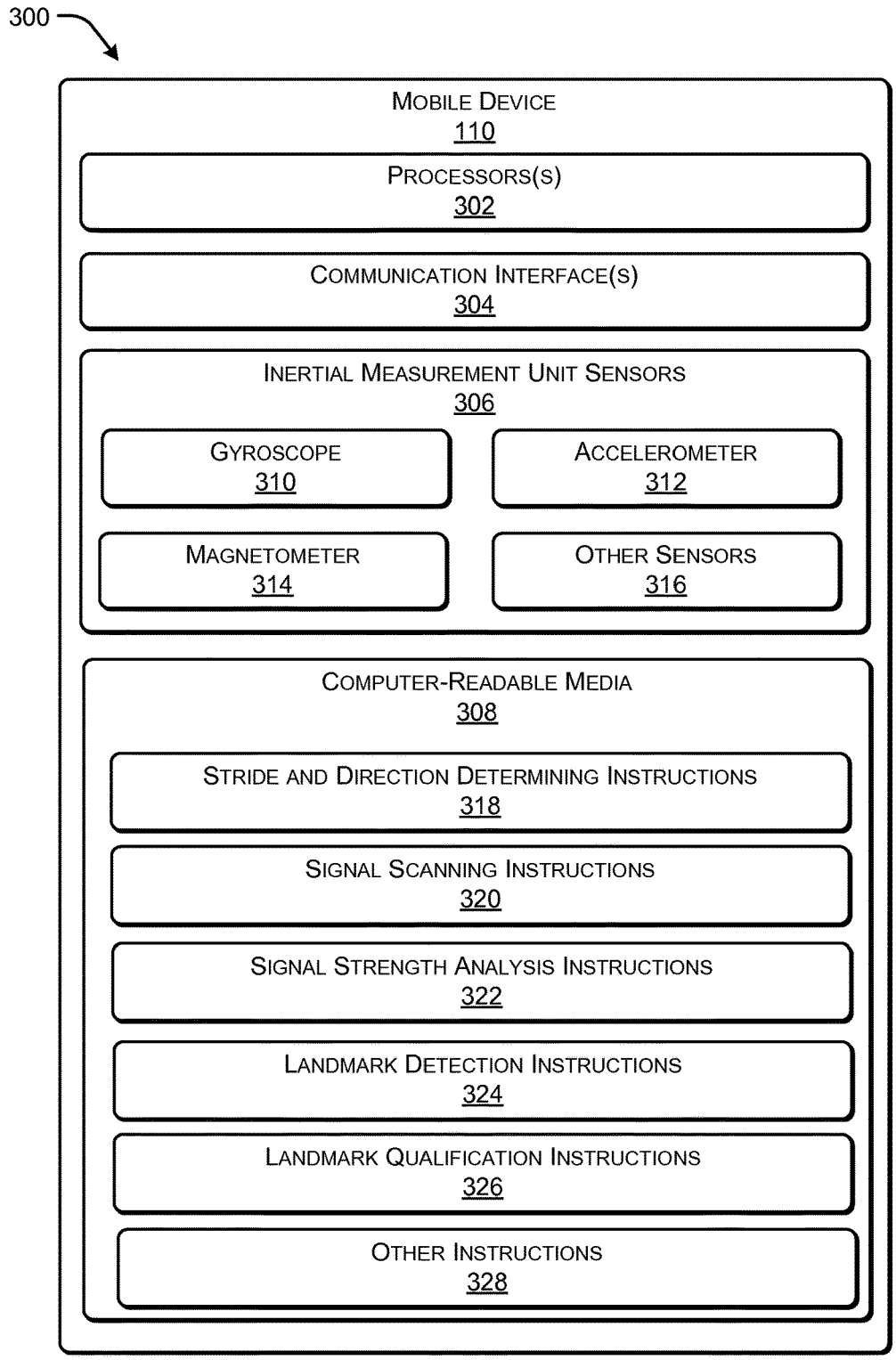
FIG. 3 is a block diagram of an example framework of a mobile device according to some implementations.

FIG. 3 is a block diagram of an example framework 300 of the mobile device 110 according to some implementations. The mobile device 110 includes one or more processors 302, one or more communication interfaces 304, one or more IMU sensors 306, and computer-readable media 308.

The communication interfaces 304 are utilized to measure the RSS of signals from wireless access points. In some examples, the communication interfaces 304 may also be utilized to connect with one or more wireless access points to communicate data to and from a server. For example, communication interfaces 304 may be configured to connect with a wireless access point to communicate with a wireless local-area-network (WLAN), short-range wireless networks (such as Bluetooth®) or a mobile network provided through cell-towers (such as through CDMA systems). In one instance, the communication interfaces 304 provide the data collected from IMU sensors 306 related to distance and direction of travel and data related to the device perceived landmarks to server system to aid in the generation of pathway maps.

IMU sensors 306 include a gyroscope 310 to monitor orientation of mobile device 110, an accelerometer 312 to measure velocity, a magnetometer 314 to monitor direction and turning angles, and other IMU sensors 316 to measure and monitor the movement, velocity, orientation, and gravitational forces applied to the mobile device 110. Generally, the IMU sensors 306 collect IMU data which is utilized by the mobile device 110 to identify and qualify device perceived landmarks. The IMU data is also provided to a server system together with the location of the device perceived landmarks for use by the server in generating pathway maps.

Any number of program modules, applications, or components can be stored in the computer-readable media 308, including by way of example, a stride and direction determining instructions 318, signal scanning instructions 320, signal strength analysis instructions 322, landmark detection instructions 324, landmark qualification instructions 326 and various other instructions 328. Generally, the instructions stored in computer-readable media 308 and executable by the processors 302 cause the mobile device 110 to perform various tasks. The computer-readable media 308 includes, at least, two types of computer-readable media, namely computer storage media and communications media.

The computer storage media includes volatile and non-volatile, removable and non-removable media implemented in any method or technology for storage of information such as computer readable instructions, data structures, program modules, or other data. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by the computing device. In contrast, communication media may embody computer readable instructions, data structures, program modules, or other data in a modulated data signal, such as a carrier wave, or other transmission mechanism. As defined herein, computer storage media does not include communication media.

Generally, the stride and direction determining instructions 318 cause the mobile device 110 to collect data from the IMU sensor 306 and to determine a general direction and distance of travel. The signal scanning instructions 320, when executed by processors 302, cause the mobile device 110 to measure the wireless signals to determine the RSS at the time of scanning. In some examples, the signal scanning instructions 320 cause the mobile device to scan for the RSS of the wireless signal when the data from IMU sensors 306 (such as the accelerometer 312) indicate the mobile device 110 is in motion. By scanning when the mobile device 110 is in motion, increases overall energy consumption of the mobile device 110.

The signal strength analysis instructions 322, when executed by processors 302, cause the mobile device 110 to record and monitor the trend in the RSS. The landmark detection instructions 324, when executed by processors 302, cause the mobile device 110 to identify tipping points in the trend of the RSS and to record the location at which the tipping point occurred. The landmark qualification instructions 326, when executed by processors 302, cause the mobile device 110 to analyze the data from IMU sensors 306 to validate device perceived landmarks.

In an example, the processors 302 execute stride and direction determining instructions 318 which cause the IMUS sensors 306 to determine if the mobile device 110 is being moved. If the IMU readings indicate that the mobile device 110 is in steady motion, the processors 302 execute the signal scanning instruction 320 to cause the mobile device to periodically measure and record the RSS of wireless signals in range.

The processors 302 also execute the signal strength analysis instructions 322, which causes the mobile device 110 to analyze and monitor the RSS values to identify changes in the RSS trend. For example, the signal strength analysis instructions 322 may be configured to smooth the RSS values using a weighted window. The processors 302 may then execute the landmark detection instructions 324, to compare the steepness of the slope of the curve to a threshold. If the steepness is greater than the threshold a device perceived landmark has been detected. For instance, a device perceived landmark may be detected if the slope changes by more than five dbm within a five meter proximity around the location of the tipping point.

The device perceived landmark is then qualified by the mobile device 110 using the landmark qualification instructions 326. The landmark qualification instruction 326 cause the processors 302 to access the data from IMU sensors 306 to determine if a steady movement occurred at the location where the tipping point in the RSS was identified. For example, data from the gyroscope 310 may indicate wild motions, typically associated with removing the mobile device 110 from the user's pocket. In this example, the gyroscope data is used to disqualify the tripping point. In another example, data from the magnetometer 314 may indicate a u-turn or zigzag motion was made and that the detected tipping point was again a false positive. Thus the magnetometer data may also be used to disqualify a device perceived landmark.

In another example, the signal strength analysis, landmark detection and landmark qualification may be performed by one or more servers. For instance, the data from the IMU sensors 306 and the data related to the device perceived landmark (such as the three tuple describe above with respect to FIG. 2) may be provided to the servers. The servers may then analyze the RSS to determine the tipping point in the RSS trend and to qualify the device perceived landmark using the data form IMU sensors 306 as described above.

Figure 4:
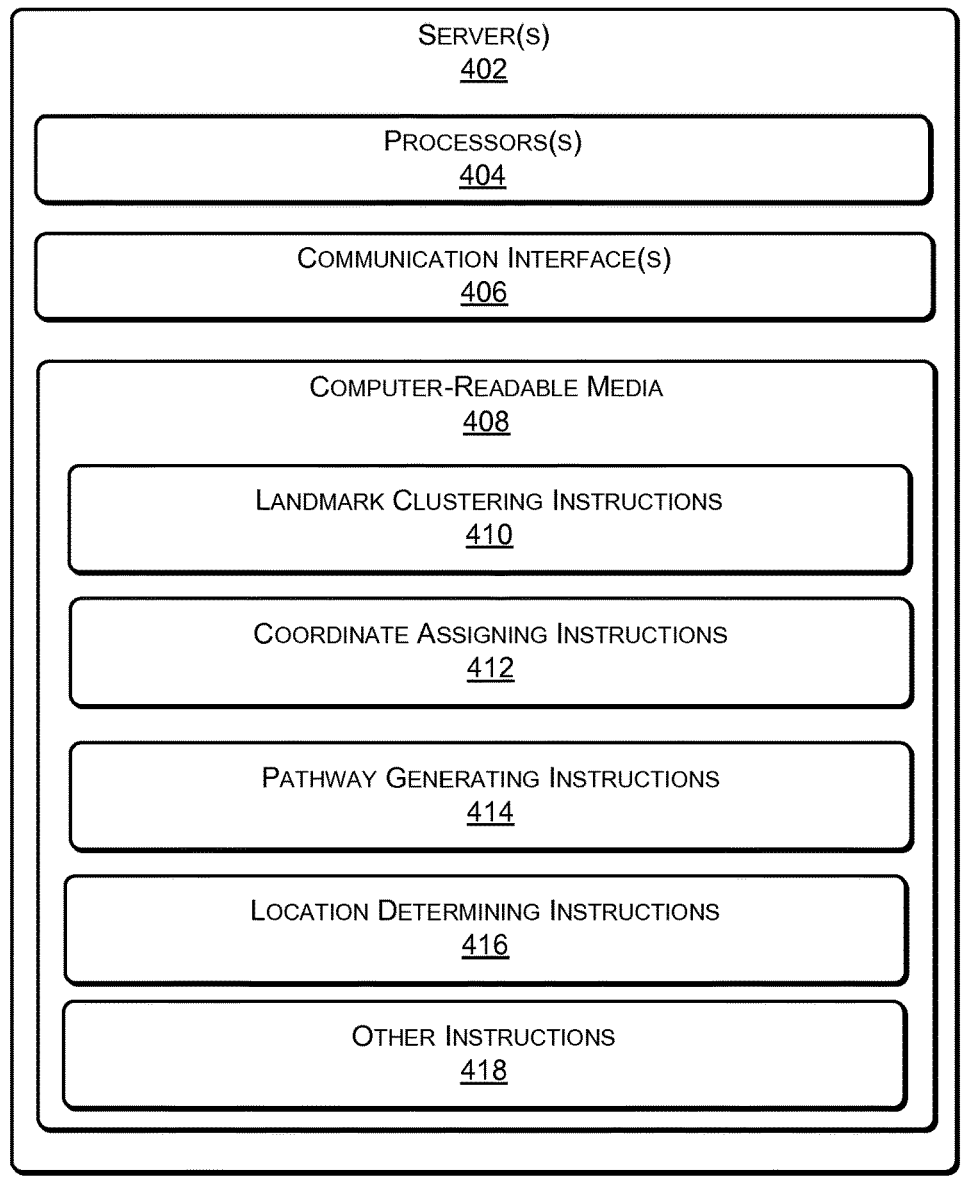
FIG. 4 is a block diagram of an example framework of a server according to some implementations.

FIG. 3 provides an example of a framework for a mobile device for identifying device perceived landmarks and collecting IMU data for use in generating a pathway map. FIG. 4 provides an example framework of a server system for utilizing the device perceived landmarks and collected IMU data to generate the pathway map.

FIG. 4 is a block diagram of an example framework 400 of a server 402 according to some implementations. Server 402 includes one or more processors 404, one or more communication interfaces 406 and computer-readable media 408. Any number of program modules, applications, or components can be stored in the computer-readable media 408, including by way of example, landmark clustering instructions 410, coordinate assigning instructions 412, pathway generating instructions 414, location determining instructions 416 and various other instructions 418. Generally, the instructions stored in computer-readable media 408 and executable by processors 404 to cause server 402 to perform various tasks. Computer-readable media 408 may include any of the types of computer-readable media described above with respect to computer-readable media 308.

In an example, the server 402 receives trajectory data (direction and distance of travel) and data related to the device perceived landmarks (such as the three tuple described above) from a plurality of mobile devices, such as mobile device 110. With regards to the data related to the device perceived landmarks, the processors 404 execute the landmark clustering instructions 410. The landmark clustering instructions 410 cause the server 402 to group or cluster landmark identified by different types of mobile devices together as a single unique landmark. For example, sensing noise and user motion, in addition to different types of devices, cause the landmarks to be identified at slightly different locations.

In one particular implementation as discussed above, the data related to the device perceived landmarks is defined as the following three tuple:

$$DPL \triangleq \{BSSID, (D_1, D_2), N\}$$

where BSSID is the ID of the master wireless access point, $(D_1, D_2)$ are steady directions before and after the tipping point of the RSS trend and N is the set of BSSIDs corresponding to neighboring wireless access points visible to the mobile device 110 at the location of the device perceived landmark together with each of the neighboring wireless access points RSS values with respect to the master wireless access point.

During the clustering process, the device perceived landmarks are first classified into groups based on the BSSID, such that all device perceived landmarks with the same master wireless access point are grouped. The server 402 further classifies the landmarks with the same master BSSID based on the direction information $(D_1, D_2)$. For instance, two device perceived landmarks may be grouped if they have the same direction (within a ±20 degree range). For the device perceived landmarks with the same master BSSID and direction, a bottom-up hierarchical clustering process may be applied to iteratively merge the closest device perceived landmarks until the distance between landmarks exceeds a threshold.

The distance between landmarks can be calculated using the RSS of the neighboring wireless access points available from set N. For example, the distance $D_N$ can be defined as follows:

$$D_N(\vec{A}_i, \vec{A}_j) = \sqrt{\sum_{n=1}^{K} (a_n^i - a_n^j)^2}$$

where $\vec{A}_i$ is the RSS differences between the master wireless access point of the first device perceived landmark and neighboring wireless access points at the location of the first device perceived landmark, $\vec{A}_j$, is the RSS differences between the master wireless access point of the second device perceived landmark and neighboring wireless access points at the location of the second device perceived landmark and K is the total number of visible wireless access points at both of the device perceived landmarks.

After clustering, a set of unique device perceived landmarks is obtained. The processors 404 next executes coordinate assigning instructions 412 to assign coordinates to each of the unique device perceived landmark of the landmark set. To assign coordinates both direction and distance information obtained from the IMU sensors is used. First, the distances are obtained by counting steps or accumulating stride lengths. It should be noted that distance values obtained in this manner may deviate widely from a direct displacement measurement between two device perceived landmarks. For instance, a wall may block the direct route between two physically close landmarks. For this reason, the direction information is used to calculate the displacement between each pair of device perceived landmarks within a landmark set. Once the displacement is measured the coordinates can be assigned using node embedding theory.

Once the landmarks of a landmark set have been assigned coordinates the landmark set may be combined, together, with the trajectory data received via the one or more communication interfaces 306 to generate pathway maps according to pathway generating instructions 414. During the pathway map generating process, the trajectories are broken down into segments ending at device perceived landmarks. That is into segments in which each segment ends at two neighboring landmarks. The segments are then arranged using the coordinates assigned to the landmarks. For example, an affine transform may be applied to the segments with respect to the coordinates of the associated landmarks.

A device perceived landmark of the landmark set is then selected and all segments with an end associated with the selected landmark are drawn on a map by coloring corresponding pixels. A center is then selected and the pixels of each segment are expanded according to their distance from the center. For example, the pixels may be expanded according to a linear weighting scheme. The expanded segments are then overlaid and the weight of overlapping pixels is summed for each pixel. This process is then repeated for the remaining landmarks of the landmark set.

A shrinking process is then applied to the overlay map to prune away low weighted outer pixels. For example, any pixel with a summed weighted average below a threshold may be removed from the pathway map. The pruned map is then analyzed to identify and remove any remaining isolated pixels (i.e. pixels not on any path). The remaining lines are then smoothed and a pathway map is generated. The pathway map may then be used to support location-based services.

Illustrative Processes

Example methods for performing techniques described herein are discussed in detail below. These example methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote memories.

The example methods are sometimes illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer executable instructions that, when executed by one or more processors, perform the recited operations.

Figure 5:
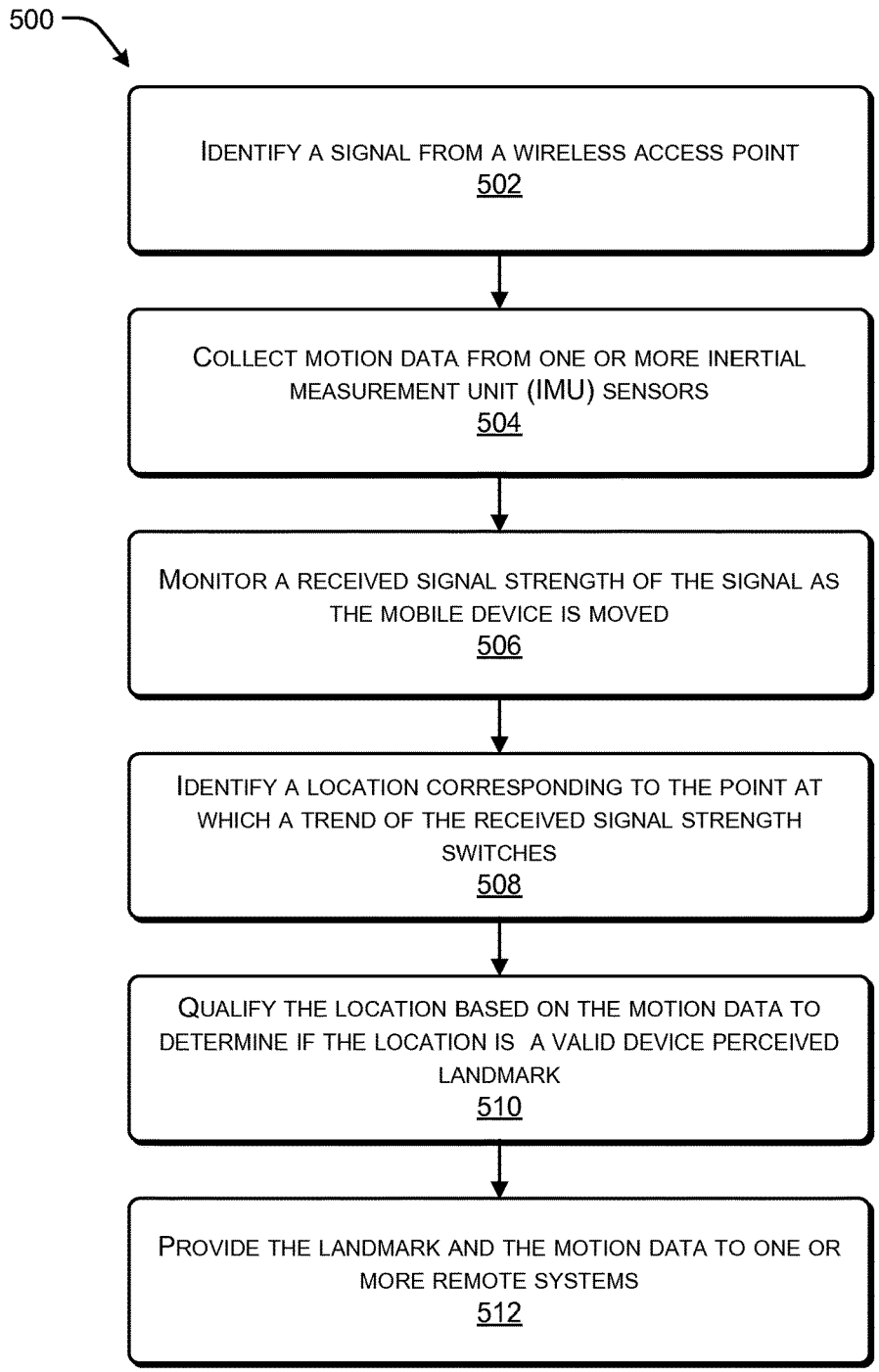
FIG. 5 is a flow diagram of an example process for locating a device perceivable landmark according to some implementations.

FIG. 5 is a flow diagram of an example process 500 for locating a device perceivable landmark according to some implementations. At 502, a mobile device, such as mobile device 110, identifies signals from visible wireless access point. The mobile device associates with the master wireless access point and stores the BSSIDs accordingly.

At 504, the mobile device collects data from the one or more IMU sensors. The IMU data is first used to determine if the mobile device is in motion and to cause the mobile device to perform 506 below. For example, the mobile device may utilize an accelerometer to determine if the mobile device is in motion and a gyroscope to determine if the motion is stable and when both of these conditions are true to begin measuring and storing the RSS of the wireless signals visible to the mobile device.

At 506, the mobile device monitors the RSS of the wireless signals as the mobile device moves. For example, the mobile device may periodically perform a scan to detect, measure and store the RSS of the wireless signals visible to the mobile device. In some instances, the scan may be preformed when the IMU data indicates that the mobile device has moved more than a predefined distance. In another instance, the mobile device may scan continuously. By scanning when the device is in motion, the mobile device is able to conserve power without impacting accuracy as the RSS values remains substantially the same when the mobile device is stationary.

At 508, the mobile device identifies a location corresponding to the point at which a trend of the RSS switches (i.e. changes from increasing to decreasing or decreasing to increasing). For example, the mobile device may smooth the RSS values into a curve and then compare the steepness of the slope of the curve to a threshold to determine if a point on the trend is a tipping point.

At 510, the mobile device qualifies the location based on the motion data to determine if the location is a valid device perceived landmark. For example, the motion data collected from a gyroscope may indicate wild movement and changes in direction at the location. The wild motion indicates that the changes in RSS trend was an error and may be caused by the user taking the mobile device out of a pocket. However, if the motion data from the IMU sensors indicates a steady movement than the location is identified as a device perceived landmark.

At 512, the mobile device provides the device perceived landmark and the motion data from the IMU sensors to one or more remote systems for further processing. For example, the servers may perform additional landmark validation and qualification, landmark clustering, or pathway map generation.

Figure 6:
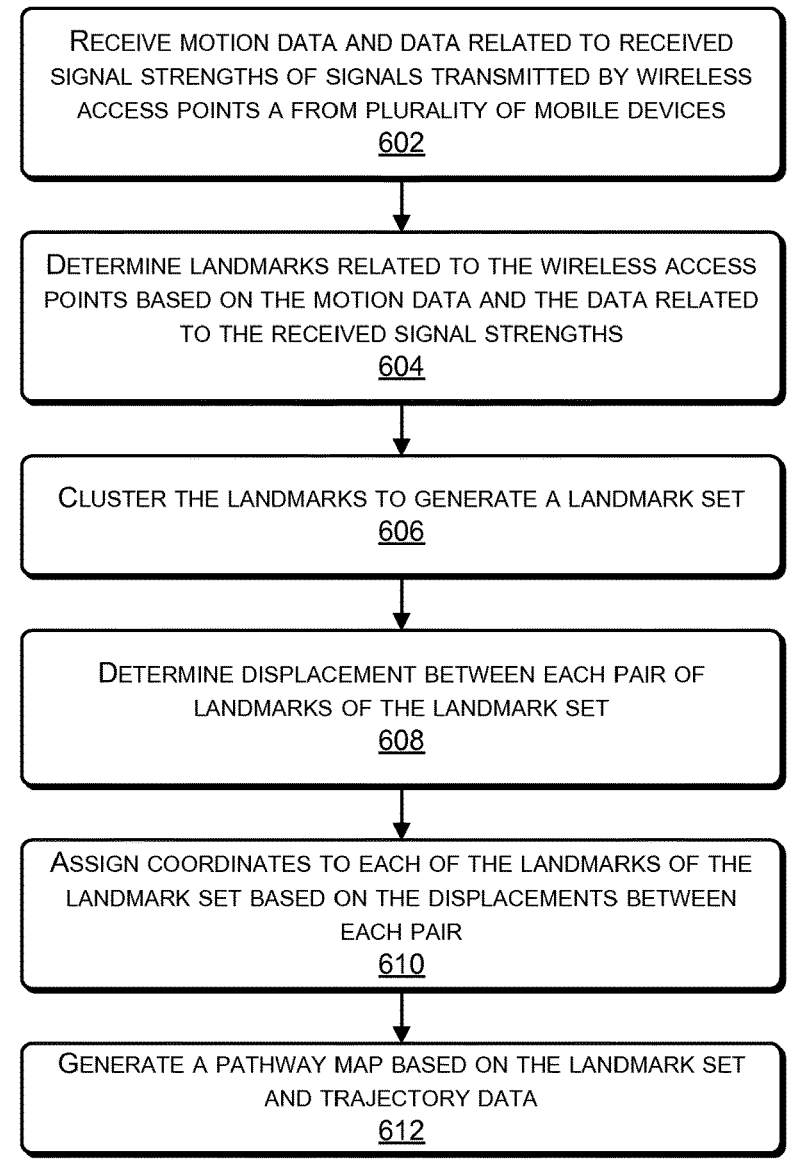
FIG. 6 is a flow diagram of an example process for generating a landmark set according to some implementations.

FIG. 6 is a flow diagram of an example process for generating a landmark set according to some implementations. At 602, one or more servers, such as server 402, receives motion data (IMU data) and data related to RSS of signals transmitted by wireless access points from a plurality of mobile devices.

At 604, the servers determine device perceived landmarks related to the wireless access points based on the motion data and the data related to the RSS received from the plurality of mobile devices. For example, the servers identify locations corresponding to points at which a trends of the RSS from each mobile device changes (i.e. from increasing to decreasing or decreasing to increasing). The servers next qualify the location based on the motion data from the corresponding mobile device to determine if each location is a valid device perceived landmark. For example, the motion data collected from the IMU sensors of the corresponding mobile device may indicate that the corresponding mobile device made a u-turn at the location causing the change in RSS tend. In this example the location is disqualified as a device perceived landmark. However, if the motion data from the IMU sensors indicates a steady movement at the location, then the location is a device perceived landmark.

At 606, the servers cluster the landmarks to generate a landmark set. Because of device diversity, sensing noise and user motion a device perceived landmark identified by one mobile device may be at slightly different locations than the same device perceived landmark identified by other mobile devices. To compensate the servers cluster the device perceived landmarks by first classifying the device perceived landmarks into groups based on the master BSSID, such that all device perceived landmarks with the same master wireless access point are grouped. The servers further classify the landmarks with the same master BSSID into sub-groups based on the motion data. For instance, two device perceived landmarks may be further classified if both device perceived landmarks have motion data that indicates both mobile devices were moving in the same direction at the location of the tipping point. For the device perceived landmarks with the same master BSSID and direction a bottom-up hierarchical clustering process may be applied to iteratively merge the closest device perceived landmarks until the distance between the remaining device perceived landmarks exceeds a thresholds. After clustering is complete, a landmark set of unique device perceived landmarks is obtained.

At 608, the servers determine displacement values between each pair of landmarks of the landmark set. First, the distances are obtained by counting steps or accumulating stride lengths. It should be noted that distance values obtained in this manner may deviate widely from a direct distance measurement between two device perceived landmarks. Therefore, direction information obtained from the motion data is used together with distance information to calculate the displacement between each pair of device perceived landmarks within the landmark set.

At 610, the servers assign coordinates to each of the device perceived landmarks within the landmark set. The servers may apply node embedding techniques using the displacement between each pair of landmarks to assign coordinates. In one implementation, the coordinates are assigned using a spring relaxation concept in which each edge of the graph is a spring and the whole graph forms a spring network. An edge or spring is added between pairs of landmarks as long as there exists a displacement measurement between them. The rest length of the edge or spring is the real measurement between the pairs. The discrepancy between the real measurement (rest length of a spring) and the calculated distance (known displacement) results in residual potential energy on the spring. The residual potential energy is used to adjust the landmark coordinate by either pushing or pulling the landmark based on residual potential energy of the springs attached to the landmark.

In one implementation, initially each landmark of the landmark set is assigned a coordinate corresponding to the origin. As each edge or spring is added the coordinates are updated based on the forces exerted on the landmark. For instances the following formula may be used to calculate an adjustment vector $\vec{\varepsilon}_{i,j}$:

$$\vec{\varepsilon}_{i,j} = \sum_{k=1}^{N_{e,i,j}} (\vec{r}_{i,j,k} - \vec{d}_{i,j})$$

where $\vec{d}_{i,j}$ equals the current displacement vectors between landmark i and a neighboring landmark j, $N_{e,i,j}$ is real measurement constraints between landmark and j, and let $\vec{r}_{i,j,k}$ be the $k^{th}$ constraint. The gross adjustment vector $\vec{F}_i$ is then calculated by summing up $\vec{\varepsilon}_{i,j}$ over neighboring landmarks. The landmarks coordinates are then updated by adding $\vec{F}_i$ to the landmarks current coordinates.

At 612, the servers generate a pathway map based on the landmark set including coordinates and on trajectory data received from the plurality of mobile devices as will be described in more detail below with respect to FIG. 7.

Figure 7:
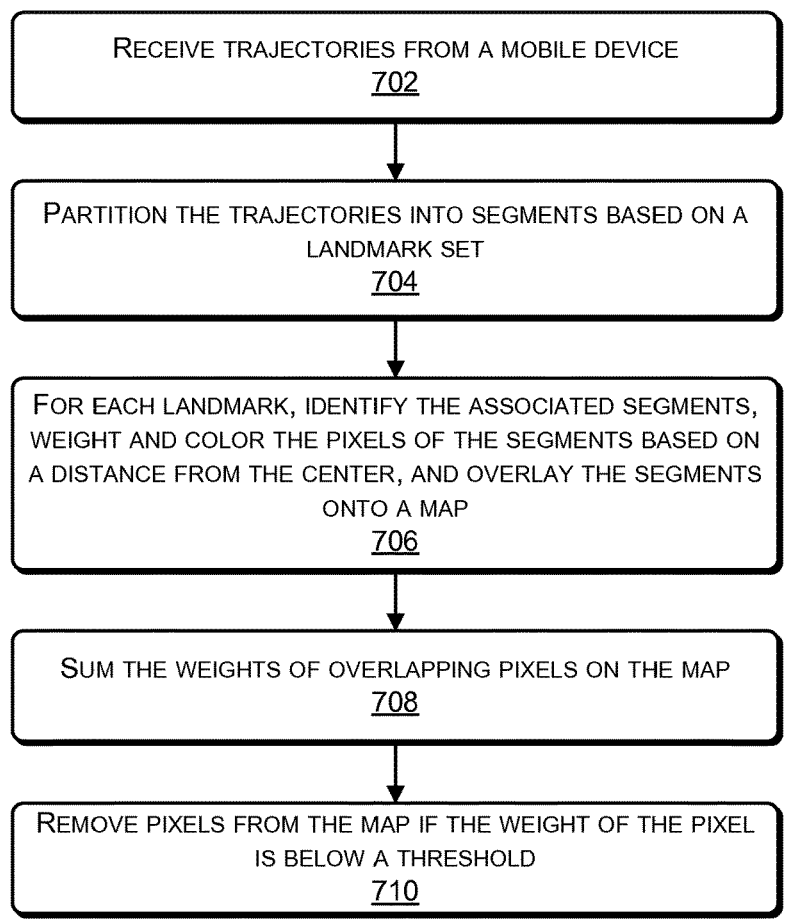
FIG. 7 is a flow diagram of an example process for generating a pathway map according to some implementations.

FIG. 7 is a flow diagram of an example process 700 for generating a pathway map according to some implementations. At 702, one or more servers, such as server 404, receive user trajectories (distance and direction data) from a plurality of mobile devices.

At 704, the servers partition the trajectories into segments based on a landmark set. Each of the segments end at a device perceived landmark of the landmark set, such that each segment is associated with two of the landmarks of the landmark set. The segments are then arranged using the coordinates assigned to the landmarks. For example, an affine transform may be applied to the segments with respect to the coordinates to locate them.

At 706, the server iteratively selects a device perceived landmark and identifies the segments associated with it, weights and colors the pixels of the segment based on a distance from the center and overlays the segments onto a map. For example, the pixels of each segment may be expanded and colored according to a linear weighting scheme.

At 708, the servers sum the weights of overlapping pixels on the map to determine a pixel weight for each pixel on the map. For example, if multiple mobile devices have trajectories over the same map pixel then that pixel becomes more heavily weighted compared to a pixel that corresponds to a trajectory traveled by a single mobile device.

At 710, the server removes pixels from the map if the weight of the pixel is below a threshold. For example, a shrinking process may be applied to the overlay map to prune away low weighted, isolated or outlying pixels, as these pixels are likely to be based on erroneous data. The pruned map is then analyzed to identify and remove any remaining isolated pixels (i.e. pixels not belonging to any path). The remaining lines are then smoothed and a pathway map is generated. The pathway map may then be used to support indoor location-based services.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. One or more computer storage media comprising instructions which, when executed by one or more processors, cause the one or more processors to:
    receive, from a mobile device, data related to a received signal strength of a signal from a wireless access point;
    receive, from the mobile device, a plurality of inertial measurements;
    monitor a trend of the received signal strength, wherein the trend of the received signal strength indicates that the received signal strength is increasing or decreasing;
    determine that the trend of the received signal strength switches either from increasing to decreasing or from decreasing to increasing;
    identify, based at least in part on the determination that the trend of the received signal strength has switched, a location as a perceivable landmark; and
    based at least in part on identifying the location, perform a perceivable landmark qualification process by:
        determining that the location is a qualified landmark based at least in part on the plurality of inertial measurements indicating a stable motion, or
        determining that the location is not a qualified landmark based at least in part on the plurality of inertial measurements indicating an unstable motion.

2. The one or more computer storage media as recited in claim 1, further comprising instructions which, when executed by one or more processors, cause the one or more processors to:
    detect a maximum received signal strength based at least in part on the determination that the trend of the received signal strength switches from increasing to decreasing; or
    detect a minimum received signal strength based at least in part on the determination that the trend of the received signal strength switches from decreasing to increasing.

3. The one or more computer storage media as recited in claim 1, further comprising instructions which when executed by one or more processors, cause the one or more processors to:
    cluster a plurality of qualified landmarks to generate a landmark set, the landmark set including a displacement measurement between individual pairs of qualified landmarks of the landmark set and a coordinate for individual qualified landmarks of the landmark set; and
    generate a map based at least in part on the landmark set.

4. The one or more computer storage media as recited in claim 3, further comprising instructions which, when executed by the one or more processors, cause the one or more processors to:
    receive trajectories from the mobile device;
    partition the trajectories into segments based on the landmark set, each segment including a plurality of pixels;
    weight the plurality of pixels of each segment;
    overlay the plurality of pixels of each segment onto the map;
    sum the weight of overlapping pixels; and
    remove pixels from the map if the summed weight is less than a threshold.

5. The one or more computer storage media as recited in claim 3, further comprising instructions which, when executed by the one or more processors, cause the one or more processors to cluster the plurality of qualified landmarks to generate the landmark set by:
classifying the individual qualified landmarks of the landmark set into groups based at least in part on a master wireless access point associated with the individual qualified landmarks of the landmark set;
classifying the plurality of qualified landmarks of the landmark set into sub-groups based at least in part on a direction of travel determined from the plurality of inertial measurements;
calculating a distance between one or more pairs of qualified landmarks within the sub-group; and
clustering a pair of qualified landmarks if the distance between the pair of qualified landmarks is less than a threshold.

6. The one or more computer storage media as recited in claim 1, wherein:
the stable motion includes at least one of a straight line or a turning of a corner; and
the unstable motion includes at least one of a u-turn or a zigzag motion.

7. The one or more computer storage media as recited in claim 1, wherein:
the plurality of inertial measurements include:
a first set of inertial measurements received from the mobile device before the switching of the trend; and
a second set of inertial measurements received from the mobile device after the switching of the trend; and
the perceivable landmark qualification process includes comparing the first set of inertial measurements to the second set of inertial measurements.

8. A method comprising:
identifying, by a mobile device, a signal of a wireless access point;
monitoring a received signal strength of the signal;
monitoring a trend of the received signal strength, wherein the trend of the received signal strength indicates that the received signal strength is increasing;
detecting a location at which the received signal strength is at a maximum based at least in part on the trend of the received signal strength switching from the increasing in strength to decreasing in strength;
identifying the location as a landmark; and
performing a landmark qualification process for the landmark based at least in part on inertial measurements received from the mobile device while the signal strength was increasing and inertial measurements received from the mobile device while the signal strength was decreasing.

9. The method as recited in claim 8, wherein the monitoring the received signal strength is performed while the mobile device is in motion.

10. The method as recited in claim 8, further comprising providing, by the mobile device, data related to the landmark to a remote system via one or more communication interfaces.

11. The method as recited in claim 8, wherein performing the perceivable landmark qualification process comprises determining that the landmark is a qualified landmark based at least in part on a comparison of the inertial measurements received while the signal strength was increasing to the inertial measurements received while the signal strength was decreasing indicating a stable motion.

12. The method as recited in claim 8, wherein performing the perceivable landmark qualification process comprises determining that the landmark is not a qualified landmark based at least in part on a comparison of the inertial measurements received while the signal strength was increasing to the inertial measurements received while the signal strength was decreasing indicating an unstable motion.

13. A device comprising:
one or more communication interfaces for receiving a signal from a wireless access point;
one or more inertial measurement unit (IMU) sensors to collect data related to movement of the device;
one or more processors; and
one or more computer-readable storage media storing instructions which, when executed by the one or more processors, cause the one or more processors to perform operations comprising:
monitoring a trend of a received signal strength of the signal to identify a perceivable landmark, the perceivable landmark corresponding to a location at which the trend of the received signal strength changes either from increasing in strength to decreasing in strength or from decreasing in strength to increasing in strength while the data related to the movement of the device indicates the device is in motion; and
based at least in part on identifying the perceivable landmark, performing a perceivable landmark qualification process to determine whether the perceivable landmark is a qualified landmark.

14. The device as recited in claim 13, wherein the one or more IMU sensors comprise at least one of an accelerometer, a gyroscope or a magnetometer.

15. The device as recited in claim 13, wherein the operations further comprise providing data related to the qualified landmark to a remote system via the one or more communication interfaces.

16. The device as recited in claim 15, wherein the operations further comprise receiving data related to a location-based service.

17. The device as recited in claim 13, wherein the operations further comprise detecting at least one of:
a maximum received signal strength based at least in part on the trend of the received signal strength changing directions from increasing in strength to decreasing in strength; or
a minimum received signal strength based at least in part on the trend of the received signal strength changing directions from decreasing in strength to increasing in strength.

18. The device as recited in claim 13, wherein performing the perceivable landmark qualification process includes determining whether the perceivable landmark is a qualified landmark based at least in part on the data related to the movement of the device.

19. The device as recited in claim 13, wherein performing the perceivable landmark qualification process includes determining that the perceivable landmark is a qualified landmark based at least in part on the data related to the movement of the device indicating a stable motion.

20. The device as recited in claim 13, wherein performing the perceivable landmark qualification process includes determining that the perceivable landmark is not a qualified landmark based at least in part on the data related to the movement of the device indicating an unstable motion.

\* \* \* \* \*